United States Patent Office 3,788,874
Patented Jan. 29, 1974

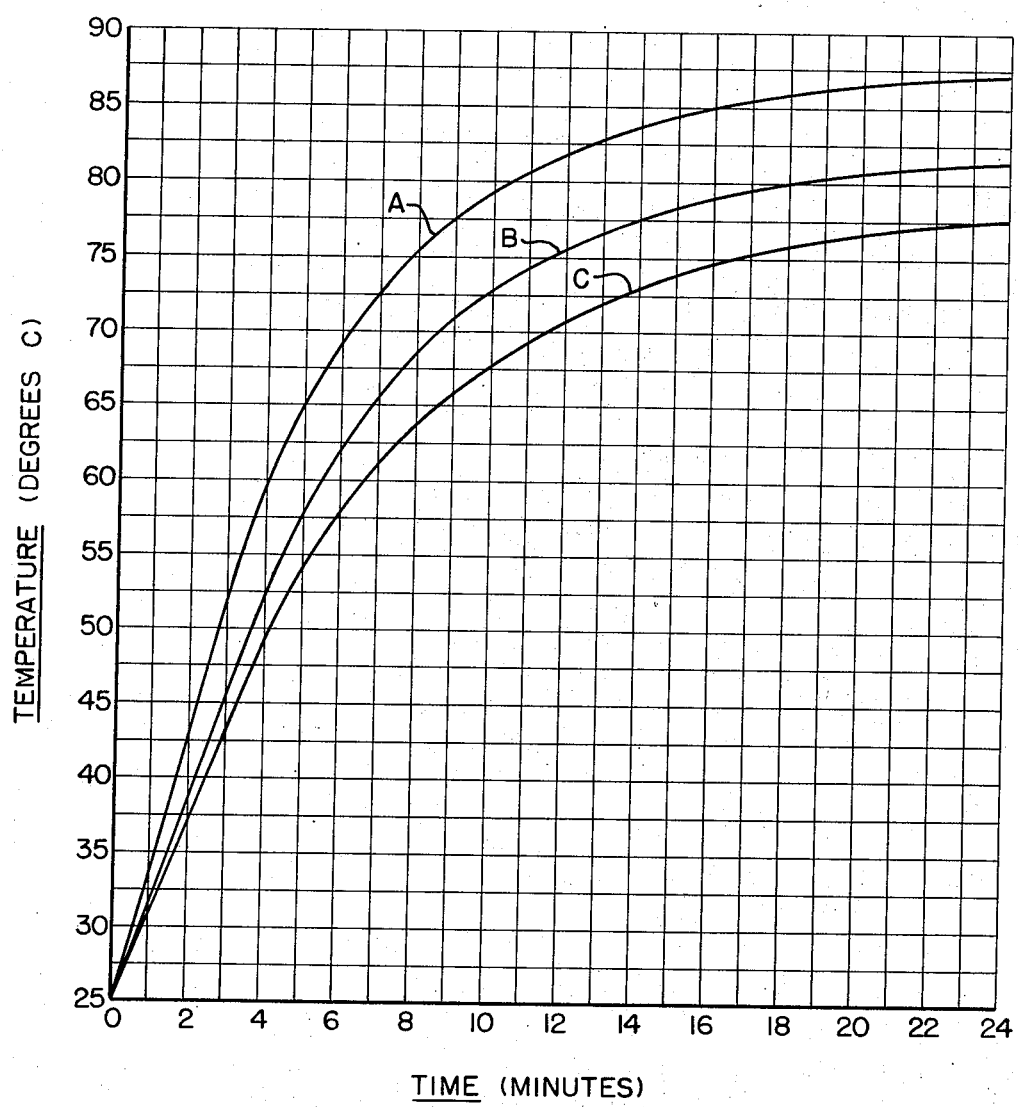

3,788,874
LOW POROSITY COATING AND METHOD FOR PRODUCING SAME
William B. Crandall, Wheaton, Ill., and Charles M. Lee, Jr., Luthersburg, Pa., assignors to Sybron Corporation, Rochester, N.Y.
Filed Nov. 29, 1971, Ser. No. 202,840
Int. Cl. B44c 1/06
U.S. Cl. 117—23                    9 Claims

ABSTRACT OF THE DISCLOSURE

A low porosity glass coat is applied to an article by maintaining the article at a temperature at least as high as the fusion point of the glass while depositing particles of the glass upon the article at a rate no greater than the rate at which the particles fuse to the article.

BACKGROUND OF THE INVENTION

This invention relates to low porosity glass coatings and more particularly to a method for applying low porosity glass coats to metallic substrates.

Enamel or glass coated steel has long been used for many purposes where the smooth, corrosion resistant glossy surface of such coatings is desirable. The demand for such equipment is particularly high in the chemical, food and beverage processing industries where enamel or glass coated metal has been used for reactors, tanks and numerous other types of equipment.

Enameled process equipment is conventionally produced by one of three general techniques which are known as "straight spray," "spray dust" and "hot dust." In all three techniques, several coats of glass are usually applied to the metal with the article being heated, or fired, to fuse each coat after it has been applied.

In each technique, the first step is the application of a "ground coat enamel" upon the surface of the metal. Ground coats are specially formulated to enhance uniform coating of the base metal and to form a strong bond between the base metal and subsequently applied surface or cover coats. These ground coats are characterized by low surface tension, the ability to wet the metal surface, the capacity to dissolve oxides that form when the metal is heated and the ability to provide a proper bubble structure for collection of hydrogen gas which diffuses up from low carbon or mild steel when it cools after being heated. The ground coats are conventionally applied in the form of an aqueous slurry, known as "slip," and the article is then heated to fuse the ground coat to the base metal.

After the ground coat has been fused, cover coats are applied to the ground coat. These cover coats are formulated to provide the chemical resistance, impermeability, opacity and mechanical characteristics desired in the finished article.

In the straight spray method for applying cover coats, the ground coated article is allowed to cool to ambient temperature. The cover coat glass is then applied in the same manner as the ground coat glass, i.e., as an aqueous slurry or slip. The coated article is dried to remove water and then reheated to fuse the cover coat to the ground coat. This process is repeated several times until the desirde coating thickness, which is typically in the range of 50 mils, is produced.

In the spray dust method, a cover coat slip is applied in the same manner, but before this cover coat is fired dry glass powder is applied to the wet slip to build up the coating thickness. This reduces the number of times that the article must be fired.

The hot dust method differs from the foregoing processes in that the cover coat glass is applied as a dry powder while the article is at an elevated temperature. As soon as the ground coated article is taken from the firing furnace dry particles of the cover coat glass are applied to the heated surface. The first particles will fuse to the cover coat and subsequent particles will be partially fused or sintered together. The particles are usually applied at a rather rapid rate to maximize the thickness of coating which can be achieved before the temperature drops to the point where the particles will no longer adhere. When this point is reached, the article is reinserted in the furnace and heated to completely fuse the cover coat to the substrate. Again, it is usually necessary to repeat this process several times in order to achieve the desired coating thickness.

All three of these methods produce cover coats having a significant degree of porosity. In the straight spray and spray dust methods water and suspension additives in the slip produce gases which are unable to escape. In the spray dust and hot dust methods, air is trapped between the dry glass particles as they are applied. Some of this air is unable to escape during subsequent firing. Typical porosity levels are around 13.5% for the straight spray method, 10% for the spray dust method, and 9% for the hot dust method.

This porosity leads to a number of problems in conventional enameled equipment. Porosity reduces the corrosin integrity of the glass coating. As a result, thicker coatings must be used to achieve the same corrosion resistance, which reduces heat transfer through the coat and increases susceptibility to thermal shock damage. In addition, these pores reduce the thermal conductivity of the glass coats. Glassed steel is frequently used in chemical process reactors which must be heated or cooled to maintain a desired reaction temperature. The thickness and thermal conductivity of the glass lining are frequently significant factors in determining the overall coefficient of heat transfer through the reactor wall. Also, the bubbles frequently congregate in clusters, producing locations where corrosive attack and mechanical failure are likely to occur. Thus, it would be desirable to have a means of providing a low porosity coating in order to increase the corrosion integrity of the coating, thereby making thinner coatings possible, improve the thermal conductivity of the glass, and obviate the other problems caused by porosity. It is an object of this invention to provide such a low porosity enamel or glass coating.

SUMMARY OF THE INVENTION

In the method of this invention the article to be enameled is held at a temperature at least as high as the fusion point of the glass, and small particles of the glass are deposited on the surface at a rate no greater than the rate at which these particles fuse to the surface.

In this process, the glass particles are continuously being fused to the surface as they are applied. As a result, air entrapment is eliminated and a uniform, low porosity coating is produced. Coatings having virtually no porosity can be produced by this method.

DRAWING

This figure is a graph of test results comparing the thermal conductivity of samples produced by the method of this invention, by conventional hot dusting and by spray dusting.

DETAILED DESCRIPTION

The method of this invention can be used to apply both ground coats and cover coats. However, when the glass is being applied to low carbon or mild steel it is usually desirable to apply the ground coat to the metal as an aqueous slurry before the metal is heated in order to reduce the amount of metal oxides formed during firing. Also, when mild steel is heated, hydrogen diffuses into the metal. As the metal cools after firing, this gas diffuses out of the metal. Unless bubbles are provided in the ground coat to collect this gas the pressure created by the gas tends to cause the glass to pop off the base metal in small chips. This is referred to as fish scaling. In order to prevent this, it is usually preferable to apply the ground coat by conventional techniques which provide the desired bubble structure and then apply cover coats by the method of this invention. However, in the enameling of alloys, both ground and cover coats may be applied by the method of this invention because the amount of metal oxide formation is less and the fish scaling problem is not present.

The glass for the ground coat is produced by smelting glass forming ingredients to form a homogeneous molten glass which is then quenched, usually by pouring the molten glass into cold water, to produce small friable particles of glass which are known as frit. The frit is then milled in water together with various mill additions such as clays and electrolytes, which act as suspension agents and also help to produce the desired bubble structure in the ground coat, to form an enamel slip, which is a thin aqueous slurry approximating the consistancy of paint. The slip is then applied to the surface to be coated by spraying, dipping, slushing or other known enameling techniques. The coated surface is then dried and fired, usually at a temperature of around 1600° F. for about 30 minutes. This firing process causes the particles of enamel to fuse together and to adhere tightly to the base metal to form a glassy coating thereon.

A cover coat formulated to provide corrosion resistance, opacity, wear resistance, electrical resistance and/or other properties which are desired in the final coating is then applied by the method of this invention. The ground coated metal is held at a temperature at least as high as the fusion temperature of the cover coat glass and small dry particles of the cover coat gloss are applied to the ground coat at a rate no greater than the rate at which these particles fuse to the ground coat. Since glass is normally a super cooled liquid, i.e. it changes from a molten to a rigid condition upon cooling without a phase change, it does not have a well defined fusion or melting temperature. Instead, as the glass is heated the viscosity of the glass varies inversely with its temperature and eventually a temperature is reached where the glass loses its rigidity and once again becomes fluid. From enameling purposes the fusion or melting temperature of the glass is usually considered to be the temperature at which the glass will flow and wet the surface to which it is being applied at a commercially satisfactory rate but is still viscous enough to adhere to the substrate to be coated and retain its shape. Typically, the glass is heated to the point where it has a viscosity of between 10,000 and 100,000 poises. In the method of this invention, as in most enameling processes, it is usually preferable to operate at a temperature where the glass has a viscosity of around 30,000 poises, although higher or lower viscosities may be used depending upon a number of conditions such as the article which is being coated. For example, in applying a coating to a vertical wall of a vessel it may be desirable to operate at a lower temperature, i.e., a higher viscosity, in order to insure that the coating adheres to the wall properly. Conversely, if the substrate is a flat, horizontal suface it may be desirable to operate at a higher temperature in order to increase the rate at which the coating can be applied. In most cases, the desired viscosity will be reached at a temperature between about 1500 and 1850° F. Glasses for enameling are usually formulated to have a fusion temperature in this range so that they can be applied without overheating the metal to which they are applied.

In addition to the substrate temperature, a number of other factors, such as the latent heat and the particle size of the glass being applied, affect the rate at which coatings can be applied by the process of this invention. For example, the rate can be increased by preheating the glass powders so that they will fuse more rapidly. The fusion rate is also affected by particle size. Larger particles tend to melt faster than smaller ones, thus they can be applied at a somewhat greater rate. However, if the particles are too large it is difficult to apply them uniformly. Typically, a satisfactory practical balance between these conflicting considerations is achieved when at least 90% of the particles are between about 20 U.S. mesh and 325 U.S. mesh, with a particularly preferable size rang being —60+200 U.S. mesh. However, larger or smaller particles may be employed.

Due to the number of factors involved, the rate at which glass may be built up by this process varies from application to application. However, the permissible rate for any given set of conditions can be readily determined by experimentation. Under typical conditions, deposition rates up to about 15 mils per minute have been found to be satisfactory, with deposition rates of about 5 to 10 mils per minute being preferable.

The particles may be applied by any one of a number of conventional powder handling techniques. For small or flat pieces that can be placed in a horizontal position, a screen with a mechanical vibrator attached had been found to be satisfactory. For larger, more complicated shapes other techniques, such as electrostatic deposition, may be employed.

The powders utilized in the process of this invention are produced by the same techniques used for producing powders for conventional hot dusting. As in the preparation of the ground coat glass, suitable glass forming ingredients are smelted and the molten glass is quenched to produce a frit. This frit is then milled to produce a dry powder having the desired size. Any of the glass compositions which are conventionally used in enameling can be used in the process of this invention, including crystallizable glasses, such as those disclosed in U.S. Pat. 3,368,712 to Sanford et al., which are heated treated after they are fused to the article to be coated to form a partially crystallized coating. However, it has been found that it is usually desirable to add a small amount, e.g. 0.25 to 2%, of a surface tension reducer such as $MoO_3$ to the cover coat composition in order to prevent surface defects such as strain lining, ground coat pull through and dimpling in the final coating. In all processes wherein powdered glass is applied to a heated ground coat the ground coat and the cover coat can interact to pull the ground coat up into the cover coat, which causes surface defects. Consequently, as in conventional hot dusting, it is usually desirable to add a surface tension reducer to the cover coat glasses used in the process of this invention. The surface tension modifier can be added either during the smelting of the glass or while the frit is being milled.

In the processes of this invention the powdered glass is immediately fused to the hot substrate as it is applied. Thus, air entrapment is eliminated and virtuallly pore free coatings are produced. Cover coats with a porosity of less than 1% may be produced routinely by this process and, with reasonable care, cover coats with a porosity of about 0.05% can be achieved. This is a marked contrast with conventional enameling techniques where porosities of from 9 to 15% are typical and, for all practical purposes, it is impossible to produce coatings thick enough for use in process equipment, which are usually at least 20 mils and more typically 50 to 80 mils thick, with a porosity of less than about 6%.

FIG. 1 demonstrates the improvement in heat transfer rate which can be achieved in coatings produced by the process of this invention. These curves were derived by placing the metallic side of various coated substrates in contact with a heat source maintained at a constant temperature and measuring the temperature of a small copper plug in contact with the coated side of the substrate.

Curve A shows the heat transfer through a sample coated by the process of this invention. Curves B and C show the heat transfer through samples coated by conventional hot dusting and spray dusting respectively. As can readily be seen from the curves, heat transfer through the sample coated by the method of this invention was significantly greater than through either of the other samples. For example, the plug in contact with the sample coated by the process of this invention was heated from 25° C. to 50° C. in approximately 2.8 minutes. The plug in contact with the sample coated by conventional hot dusting took approximately 3.6 minutes, or 29% longer, to reach the same temperature; while the plug in contact with the spray dusted coating took about 4.1 minutes, or 46% longer, to reach the same temperature. The differences became even greater at higher temperatures where the effect of heat loss to the air surrounding the plug began to be noticeable.

In addition to improving the heat transfer rate, the method of this invention also removes one of the common causes of glass failure in conventionally enameled articles, i.e., clusters of bubbles in the enamel. The porosity of coatings produced by the process of this invention is so low that there are simply not enough bubbles to produce any significant clusters. Thus, weak spots where mechanical or corrosive failure can begin do not develop.

The following examples illustrate the improvements which can be obtained in enamel coatings by the process of this invention.

Example I

Five two-inch by two-inch mild steel plates were spray coated with a slip of an alkali borosilicate glass having a viscosity of approximately 3000 poises at 1640° F., which was fused at a temperature of 1640° F. to produce a ground coat approximately 10 mils thick on each sample. A cover coat composition was smelted, quenched and milled by conventional techniques to produce a powdered alkali silicate glass having a viscosity of approximately 30,000 poises at 1600° F. The powder was screened to remove all particles larger than 140 or smaller than 250 mesh. The remaining powder was placed in a small screen dredge (a 3-inch diameter by 3-inch-high cylinder with a screen bottom and a handle for holding the dredge). The ground coated sample plates were placed one at a time in a small open-topped laboratory furnace, which was held at a temperature of 1600° F. The powder was applied by tapping the handle of the dredge, and coatings were built up at a rate of approximately 5 mils per minute. The heated substrates were monitored by an optical pyrometer during the coating process to be sure that the temperature of the substrate did not drop more than 20° F.

Additional samples were produced, using the same glasses and the same general techniques outlined above except that the cover coats were applied by conventional straight spray, spray dust or hot dust methods instead of by the process of this invention. Five samples were produced by each method.

The samples, each of which had a total coating thickness of approximately 50 to 60 mils, were then cross-sectioned and sectional photomicrographs at a magnification of 75× were taken under strong illumination to produce cross-sectional pictures of the coatings in which any pores would stand out clearly. The porosity of these samples was then measured by the Rosiwal method, a statistical method for determining porosity. Twenty 45° lines, ten of which were slanted in one direction and the other ten of which were slanted in the other direction so as to cross the first group of lines, were drawn from a level just below the surface of the cover coat to a level just above the ground coat. The segments of these lines which crossed pores were measured and the total length of these segments was divided by the total length of the twenty lines to find the average porosity of each cover coat.

The cover coats produced by the method of this invention had an average porosity of 0.05% while the straight spray, spray dust and conventional hot dust cover coats had average porosities of 13.5%, 10% and 8.9% respectively.

Example II

In this test, samples were produced by the process of this invention, by conventional hot dusting and by spray dusting using the glasses and procedures described in Example I. For each sample a two inch by two inch mild steel plate was machined on both sides to provide a flat plate having a uniform thickness of approximately 450 mils. A ground coat having a thickness of approximately 10 mils was then fused to the substrate. Cover coats were applied over the ground coat and the cover coats were machined flat and parallel with the steel to provide a total glass thickness of approximately 80 mils. The samples were then used to test the rate of heat transfer through the various types of cover coats. A uniform temperature, constant heat source was provided by placing a three inch diameter beaker of water on a hot plate and covering the beaker with an aluminum plate ½ inch thick. This apparatus was placed in a laboratory hood to minimize air currents and thereby minimize convection heat loss. Each sample was placed on top of the aluminum plate with the base metal in contact with the aluminium and the glass coating facing upwards. A small copper plug, approximately one-half inch cube, with a thermocouple imbedded approximately at its center, was placed on top of the glass coating. The thermocouple was connected with a recorder which measured the temperature of the copper plug as a function of time. The results of these tests are shown in the figure, where curve A shows the heat transfer through the sample coated by the method of this invention and curve B and curve C show heat transfer through a sample coated by conventional hot dusting and a spray dusted sample respectively. As can readily be seen from the graph, the heat transfer rate through the sample coated by the process of this invention was substantially greater than the heat transfer rate through either of the other samples.

Example III

Raw batch materials were dry mixed in amounts calculated to provide a glass having a weight percent analysis of:

| | Percent |
|---|---|
| $SiO_2$ | 75.2 |
| $ZrO_2$ | 1.72 |
| $B_2O_3$ | 4.28 |
| $Li_2O$ | 3.0 |
| $Na_2O$ | 16.0 |

The resulting batch was smelted and the molten glass was quenched directly into cold water to produce a frit. The frit was dry milled and screened to produce a −140+250 mesh powder. A two inch by two inch mild steel plate coated with the ground coat used in Examples I and II, was placed in a small open topped laboratory furnace held at a temperature of 1600° F. The dry powder glass was sprinkled on the heated substrate and a coating having a total thickness of 35 mils was built up at the rate of 12 mils per minute.

Another sample was produced using the same glass and the straight spray method for applying the cover coat. In this case, the frit, instead of being dry milled, was milled with water and appropriate mill additives including clay, sodium nitrite and potassium chloride to produce a typical cover coat slip which was sprayed on the ground coated substrate.

The samples were cross-sectioned, polished and photomicrographed at a magnification of 75×. By comparing the photomicrographs with photomicrographs of materials of know porosity, it was estimated that the cover coat produced by the process of this invention had a porosity of less than 0.1% while the cover coat produced by the straight spray method had a porosity of approximately 12%.

Example IV

The procedures followed in Example III were repeated with a cover coat glass having the following composition:

| | Percent |
|---|---|
| $SiO_2$ | 58.7 |
| $TiO_2$ | 8.0 |
| $ZrO_2$ | 3.4 |
| $Na_2O$ | 16.0 |
| $Li_2O$ | 3.0 |
| $K_2O$ | 6.3 |
| CaO | 4.6 |

The sample produced by the process of this invention was estimated to have a porosity of less than 0.1% while the straight spray sample was estimated to have a porosity of approximately 13%.

Example V

In these tests the samples were made from 3½″ x 3½″ x .062″ thick mild steel plates. A small stud was welded to each plate to serve as a thermocouple binding post. The edges of the plates were masked off with masking tape to leave a 2″ x 2″ area in the center. The sample was sprayed with ground coat used in the foregoing examples, which was then fused to produce a ground coat having a thickness of approximately 8 mils.

The sample was then placed in a small electric furnace which was open at the top. A dry, powdered, crystallizable alkali silicate glass having a viscosity of about 30,000 poises at 1600° F. was placed in a small screen dredge. A mechanical vibrator was attached to the handle of the dredge and powder was applied to the heated ground coated substrate from this dredge until the total glass thickness on the sample was approximately 30 mils. The sample temperature was 1670° F. at the beginning of the test and dropped to 1640° F. while the coating was being applied. The sample was continuously observed while the coating was being applied to be sure that the powder was fused as soon as it hit the heated substrate.

A cross-sectional photomicrograph of this sample at a magnification of 100× was taken and a similar photomicrograph was taken of a coating of the same glass which was applied by conventional hot dusting. The conventional hot dust cover coat was estimated to have a porosity of approximately 9% while the cover coat produced by the method of this invention was estimated to have a porosity of less than 1.5%.

The following table summarizes the average porosities of the foregoing samples.

| | Porosity, percent | | | |
|---|---|---|---|---|
| | This invention | Straight spray | Spray dust | Conventional hot dust |
| Example: | | | | |
| I | 0.05 | 13.5 | 10.0 | 8.9 |
| III | <0.1 | 12 | | |
| IV | <0.1 | 13 | | |
| V | <1.5 | | | 9 |

The foregoing examples are representative of the glasses and methods with which this invention may be employed. These examples are merely illustrative. Many other glasses may be used and many modifications may be made to the techniques described in these examples and the rest of the foregoing specification within the scope of the appended claims.

We claim:

1. A method of applying a low porosity glass coat to an article comprising maintaining the article at a temperature at least as high as the fusion point of the glass while depositing particles of the glass upon said article at a rate sufficient to build up the coat at a rate no greater than 15 mils per minute until the coat is at least 20 mils thick.

2. A method according to claim 1 wherein said article comprises a metal base and a glass ground coat fused to the base, and the particles of glass are deposited upon the ground coat.

3. A method according to claim 2 wherein the article is maintained at a temperature between about 1500 and 1850° F.

4. A method according to claim 2 wherein at least 90% of the particles are between about 20 U.S. mesh and 325 U.S. mesh in size.

5. A method according to claim 2 wherein the particles of glass are between about 60 U.S. mesh and 325 U.S. mesh in size.

6. A method according to claim 2 wherein the glass coat is deposited at a rate of from about 5 to 10 mils per minute.

7. A method of applying a low porosity glass cover coat to a ground coat, said ground coat being fused to a metal base, comprising maintaining said ground coat at a temperature between 1500° F. and 1850° F. while depositing particles of the glass on the ground coat at a rate sufficient to build up the cover coat at a rate no greater than 15 mils per minute until the cover coat is at least 20 mils thick, at least 90% of said particles being between about 20 U.S. mesh and 325 U.S. mesh.

8. A method according to claim 7 wherein said particles are between about 60 U.S. mesh and 200 U.S. mesh.

9. A method according to claim 7 wherein the cover coat is built up at a rate of from about 5 to about 10 mils per minute.

References Cited

UNITED STATES PATENTS

| 3,574,584 | 4/1971 | Girard et al. | 117—23 X |
|---|---|---|---|
| 3,132,038 | 5/1964 | Ward | 117—23 X |
| 2,952,558 | 9/1960 | Tafel | 117—23 |
| 3,248,253 | 4/1966 | Barford et al. | 117—17 |
| 3,216,847 | 11/1965 | Armant | 117—129 |
| 3,409,458 | 11/1968 | Spencer-Strong et al. | 117—70 B |
| 1,996,840 | 4/1935 | Staley | 117—23 |
| 3,039,888 | 6/1962 | Sejournet et al. | 117—32 X |
| 847,881 | 3/1907 | Boumgarn | 117—23 |
| 2,751,312 | 6/1956 | Ness | 117—129 |
| 3,044,893 | 7/1972 | Heintz et al. | 117—23 X |

WILLIAM D. MARTIN, Primary Examiner

S. P. BECK, Assistant Examiner

U.S. Cl. X.R.

117—29, 49, 70 B, 129